United States Patent [19]

Asano

[11] Patent Number: 4,695,777

[45] Date of Patent: Sep. 22, 1987

[54] VR TYPE LINEAR STEPPER MOTOR

[75] Inventor: Masuo Asano, Nagoya, Japan

[73] Assignee: Brother Kogyo Kabushiki Kaisha, Aichi, Japan

[21] Appl. No.: 293,311

[22] Filed: Aug. 17, 1981

[30] Foreign Application Priority Data

Aug. 27, 1980 [JP] Japan ................... 55-118193

[51] Int. Cl.⁴ .......................................... H02K 41/00
[52] U.S. Cl. ..................................... 318/135; 310/12
[58] Field of Search .............................. 310/12–19; 318/135

[56] References Cited

U.S. PATENT DOCUMENTS

| | | | |
|---|---|---|---|
| 3,265,911 | 8/1966 | Madsen | 310/12 |
| 3,268,747 | 8/1966 | Snowdon | 310/13 |
| 3,292,065 | 12/1966 | Frederickson | 310/12 X |
| 3,829,746 | 8/1974 | Van et al. | 310/12 X |
| 3,867,676 | 2/1975 | Chai et al. | 310/14 X |

OTHER PUBLICATIONS

IBM Tech. Disclosure Bulletin, "Linear Incremental Motor", Thompson, vol. 6, No. 9, 2/1964, pp. 19-20.

*Primary Examiner*—Donovan F. Duggan
*Attorney, Agent, or Firm*—Browdy and Neimark

[57] ABSTRACT

A linear stepper motor of the variable reluctance type including (a) a stator having a plurality of stator teeth formed with an equal pitch p along a longitudinal direction, (b) a slider having four slider poles, A pole, B pole, C pole, and D pole arranged in a longitudinal direction in that order, each of the slider poles being provided with a plurality of slider teeth formed oppositely to, and with identical pitch with, the stator teeth, and (c) four windings, A phase, B phase, C phase and D phase respectively wound about each of the slider poles independently. In this linear stepper motor, distances separating the B pole, C pole and D pole from the A pole are determined to be $(L+2/4)p$, $(M+\frac{1}{4})p$ and $(N+\frac{3}{4})p$ or $(L+2/4)p$, $(M+\frac{3}{4})p$ and $(N+\frac{1}{4})p$, respectively wherein L, M and N are natural numbers. And the four windings are connected to 2—2 phase excitation device for being repeatedly excited in at least one of the two sequences of A phase-C phase, C phase-B phase, B phase-D phase and D phase-A phase and the reversal of the former.

3 Claims, 6 Drawing Figures 4,695,777

VR TYPE LINEAR STEPPER MOTOR

BACKGROUND OF THE INVENTION

This invention relates to an improvement of a linear stepper motor of the variable reluctance type.

Linear stepper motors of this VR type are often utilized in electronic-controlled typewriters. On the slider of a linear stepper motor of this kind a print head must be mounted, and the whole weight of the slider and the print head inevitably becomes fairly large. And the slider takes considerably long time, when it is halted at a designated position, before being completely stopped. It is sometimes liable to fall into missynchronization or pull-out, i.e., to lose harmony with the drive pulses. The above-mentioned tendency has also been problematical in a VR type linear stepper motor wherein a slider having four slider poles is moved by means of 2-2 phase excitation. The structure and excitation sequence in a conventional VR type linear stepper motor of four-slider-pole system are in a style described hereunder.

A stator is provided with a plurality of stator teeth formed with an equal pitch p along a longitudinal direction thereof. A slider including four slider poles, A pole, B pole, C pole, and D pole arranged in a longitudinal direction in that order is opposed to the stator with slider teeth formed on each of the slider poles by the identical pitch in the stator teeth. On those slider poles four windings are wound independently so as to make up A phase, B phase, C phase, and D phase in that order. In the structure of a conventional VR type linear stepper motor the distances separating the B pole, C pole and D pole from the A pole are determined to $(L+1/4)p$, $(M+2/4)p$ and $(N+3/4)p$ wherein L, M and N are natural numbers. For incrementing or stepping the slider in this stepper motor by 1/4 pitch by means of the 2-2 phase excitation, the slider poles must be excited by pairing of (1) A phase-B phase, (2) B phase-C phase, (3) C phase-D phase, and (4) D phase-A phase. In this type excitation, halting of the slider arises a large problem, laying aside advantageous excitation pairing of B phase-C phase and D phase-A phase, in the excitation pairing of A phase-B phase and C phase-D phase, wherein the slider vibrates largely to take much time before being completely stopped or even sometimes lose harmony with the drive pulses. This problem is caused by a leftwardly offset location of the magnetic flux for the slider, when the slider is attempted to stop at the position corresponding to excitation pairing of A phase-B phase, and by a similar rightward offset thereof when the slider is stopped at the position of C phase-D phase excitation. Reasons for that are surmised to be such that formation of a magnetic flux offset to right or to left is liable to cause vibration in the slider perpendicular to the moving direction thereof due to imbalance of the attracting magnetic force as a consequence of the offset, and this vibration incessantly varies in turn a fine gap between the stator teeth and the slider teeth, being accompanied by another vibration in the moving direction of the slider, so as to prevent the slider from being stopped rapidly and exactly. In cases of excitation at the pairing of B phase-C phase and D phase-A phase, the magnetic flux becomes symmetrical right-and-left for making the attracting force well balanced. In short, the structure and the excitation sequence, limited thereto by that structure, of the conventional VR type linear stepper motors have not been free from the problems of large vibration of the slider when stopped hindering the speedy halting of the slider.

SUMMARY OF THE INVENTION

The primary object of this invention, which was made from such a background, is to provide an improved VR type linear stepper motor driven by 2-2 phase excitation, wherein the slider can be quickly stopped or halted with little vibration, no matter at which excitation position the slider may be halted among the four pairings of phases, by introducing a novel sequence of excitation and structure of the slider.

This object is attained according to the present invention in a linear stepper motor of the variable reluctance type including (a) a stator having a plurality of stator teeeth formed with an equal pitch p along a longitudinal direction, (b) a slider having four slider poles, A pole, B pole, C pole, and D pole arranged in a longitudinal direction in that order, each of the slider poles being provided with a plurality of slider teeth formed oppositely to, and with identical pitch with, the stator teeth, and (c) four windings, A phase, B phase, C phase and D phase respectively wound about each of the slider poles independently. In this linear stepper motor, distances separating the B pole, C pole and D pole from the A pole are determined in set to either the set of $(L+2/4)p$, $(M+1/4)p$ and $(N+3/4)p$ or the set of $(L+2/4)p$, $(M+3/4)p$ and $(N+1/4)p$ wherein L, M and N are natural numbers. And the four windings are connected to 2-2 phase excitation means for being repeatedly excited in at least one of the two sequences of A phase-C phase, C phase-B phase, B phase-D phase and D phase-A phase and the reversed of the former.

By this arrangement of the slider poles and excitation sequence of the windings the slider can be halted quickly with little vibration no matter in which excitation step the slider may be.

DETAILED DESCRIPTION OF THE PREFERRED EMBODIMENTS

Preferred embodiments of this invention will be described hereunder with reference to the appended drawing.

Figure 1:
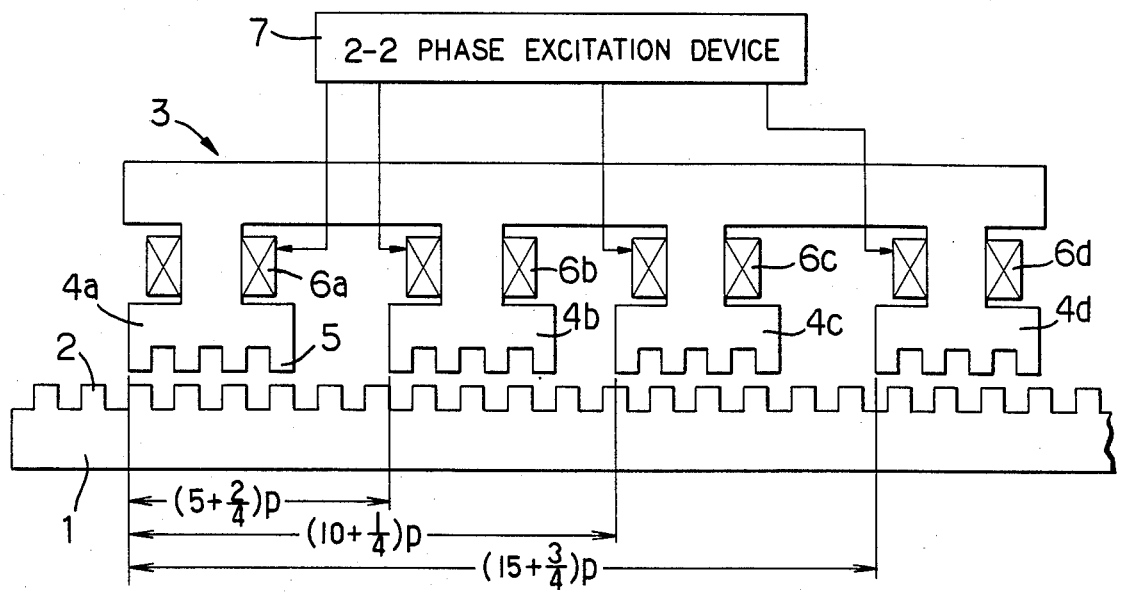
FIG. 1 is a developed view of a first embodiment of a VR type linear stepper motor of this invention showing relation between a stator and a slider.
Figure 2:
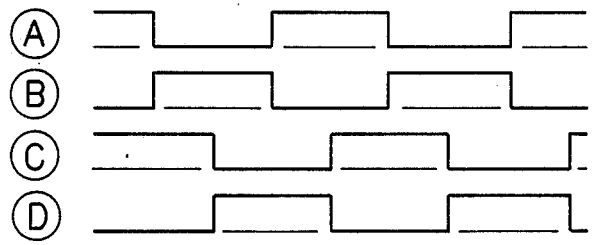
FIGS. 2 and 3 are respectively a time chart for showing sequence of excitation in the linear stepper motor.

As illustrated in FIG. 1 a VR type linear stepper motor as a first embodiment of this invention is provided with a stator 1 and a slider 3. On the upper surface of a stator 1 a plurality of stator teeth 2 are formed with an equal pitch p in a longitudinal direction. On a slider 3 four slider poles A pole 4a, B pole 4b, C pole 4c, and D pole 4d are arranged in that order from left to right, and each of whose slider poles is respectively provided with a plurality of slider teeth 5 with a similar pitch as in the stator teeth 2. Those slider poles are positioned such that: when the slider teeth 5 of the A pole 4a are rightly confronting the stator teeth 2, the slider teeth 5 of the B pole 4b are displaced relative to the stator teeth 2 by 2/4 pitch in rightward direction, i.e., similarly 2/4 pitch in leftward direction, the C pole 4c 1/4 pitch in rightward direction (3/4 pitch in leftward direction), and the D pole 4d 3/4 pitch in rightward direction (1/4 pitch in leftward direction). That is to say, the slider poles 4a, 4b, 4c, and 4d are respectively arranged in actuality such that: assuming the left extremity of the A pole 4a as a pitch displacement reference line, the distance to the left extremity of the B pole 4b is (5+2/4)p, to the left extremity of the C pole 4c is (10+1/4)p, and to the left extremity of the D pole 4d is (4+3/4)p. On each of those slider poles 4a, 4b, 4c, and 4d a winding is independently wound so as to make up A phase 6a, B phase 6b, C phase 6c, and D phase 6d in that order. As to the exciting method in such a VR type linear stepper motor, a conventional 2-2 phase exciting by a 2-2 phase excitation device 7 is adopted herewith, excepting only difference in pairing of phases simultaneously excited and ordering of excitation. In this method of excitation pairing of (1) A phase-C phase, (2) C phase-B phase, (3) B phase-D phase, and (4) D phase-A phase are repeated in that order as shown in FIG. 2, and the slider 3 is at every excitation moved leftwards by 1/4 pitch, and when pairing of phases is made as shown in FIG. 3 in the order, (1) A phase-D phase, (2) D phase-B phase, (3) B phase-C phase, and (4) C phase-A phase, i.e., an inversed sequence to the previous one, the slider 3 is at every excitation moved rightwards by 1/4 pitch.

In this linear stepper motor, when the slider teeth 5 of the A pole 4a agree with the stator teeth 2, the slider teeth 5 of the slider poles 4b, 4c and 4d are moved away from the stator teeth 2 in rightward direction by respective pitch displacement amount of 2/4 pitch, 1/4 pitch and 3/4 pitch. And it enables, through the pairing of (1) A phase-C phase, (2) C phase-B phase, (3) B phase-D phase, and (4) D phase-A phase, the slider 3 to be moved leftwards by 1/4 pitch at every excitation. By means of this type excitation the imbalance of drawing force due to offset of the magnetic flux, either leftward or rightward, by the pairing of A phase-B phase and C phase-D phase in the conventional linear stepper motor has been completely eliminated. That is because: (1) in the excitation of A phase-C phase pairing the magnetic flux is formed on a path A pole 4a→stator 1→C pole 4c→A pole 4a, which is very much improved in its slight leftward offset relative to the slider 3 in comparison to the large leftward offset in the conventional magnetic flux taking place in the A phase-B phase pairing type excitation, and (2) in the excitation of B phase-D phase pairing the magnetic flux is formed on a path B pole 4b→stator 1→D pole 4d→B pole 4b, which is very much improved in its slight rightward offset relative to the slider 3 in comparison to the large rightward offset in the conventional magnetic flux taking place in the C phase-D phase pairing type excitation. The remaining two magnetic fluxes of C phase-B phase and D phase-A phase both assume symmetrical posture in relation to the slider, leaving no problem due to well balanced drawing force. In an improved VR type of linear stepper motor the slider 3, then being driven by this way excitation, can be rapidly halted with little vibration at the time of halting, no matter in which step of the excitation sequence the slider 3 is halted.

Figure 4:
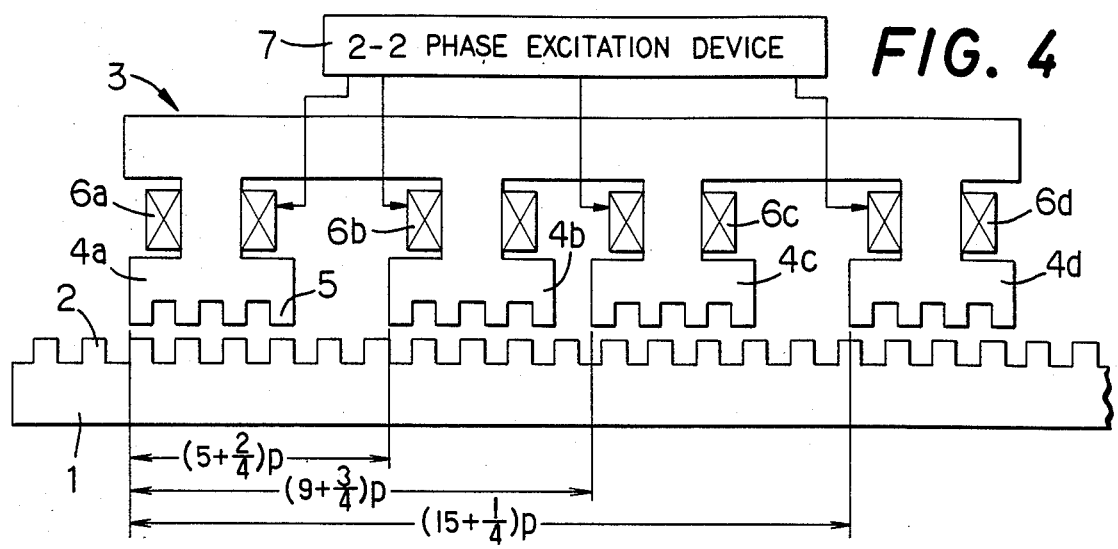
FIG. 4 is a developed view of a second embodiment.

A second embodiment will be described next with reference to FIG. 4. In a linear stepper motor of VR type, the second embodiment, shown in FIG. 4, the moving-away or pitch displacement amount of the slider teeth 5 disposed on each of the slider poles 4b, 4c and 4d is, by assuming the A pole 4a as a reference, 2/4 pitch at the B pole 4b in rightward direction, i.e., 2/4 pitch similarly in leftward direction, 3/4 pitch at the C pole 4c in rightward direction (1/4 pitch in leftward direction), 1/4 pitch at the D pole 4d in rightward direction (3/4 pitch in leftward direction). Interdistances of the slider poles 4a, 4b, 4c and 4d are in actuality, by assuming the left extremity of the A pole 4a as a reference line, (5+2/4)p to the left extremity of the B pole 4b, (9+3/4)p to the left extremity of the C pole 4c, and (15+1/4)p to the left extremity of the D pole 4d respectively.

Figure 3:
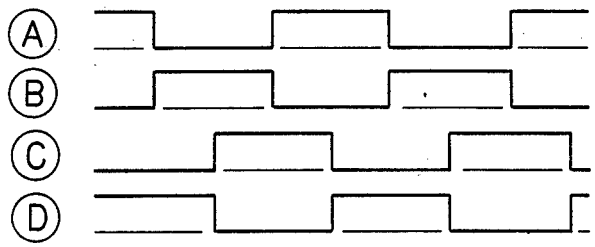

As to the excitation of the slider 3 in this instance pairing of (1) A phase-D phase, (2) D phase-B phase, (3) B phase-C phase and (4) C phase-A phase are repeated in that order as shown in FIG. 3, in which the slider 3 is moved leftwards by 1/4 pitch at every excitation. And by means of another pairing of, as shown in FIG. 2, (1) A phase-C phase, (2) C phase-B phase, (3) B phase-D phase and (4) D phase-A phase, i.e., just reversed sequence to that described above, the slider 3 is moved rightwards by 1/4 pitch at every excitation. In respect of effect, the second embodiment is similar to the first embodiment.

Figure 5:
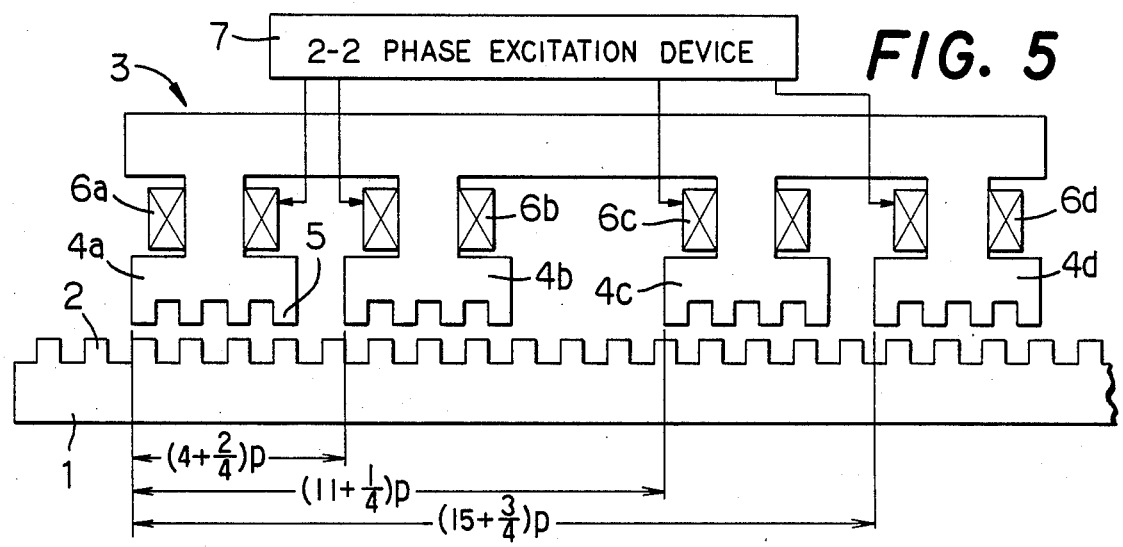
FIG. 5 is a similar view of a third embodiment.

A third embodiment will be described next referring to FIG. 5. In this instance of VR type linear stepper motor the pitch displacement amount of the slider teeth 5 on each of the slider poles 4b, 4c, and 4d is just the same in the first embodiment. The interdistance among the slider poles 4a, 4b, 4c, and 4d is respectively determined such that: assuming the left extremity of the A pole 4a as a reference line, the distance to the left extremity of the B pole 4b is (4+2/4)p, to the left extremity of the C pole 4c (11+1/4)p, and to the left extremity of the D pole 4d is (15+3/4)p. In this arrangement, the distance between A pole 4a-B pole 4b and that between C pole 4c-D pole 4d are narrowed in order to widen the distance between B pole 4b-C pole 4c. The center of the closed magnetic flux, when the pairs of (1) A phase-C phase and (3) B phase-D phase are respectively excited, is brought nearer to the center of the slider 3 for mitigating imbalance of the drawing force. It effectively reduces vibration at the time of halting of the slider 3, resulting consequently in sooner stoppage of the motor. As to the sequence of excitation the third embodiment is similar to the first embodiment.

Figure 6:
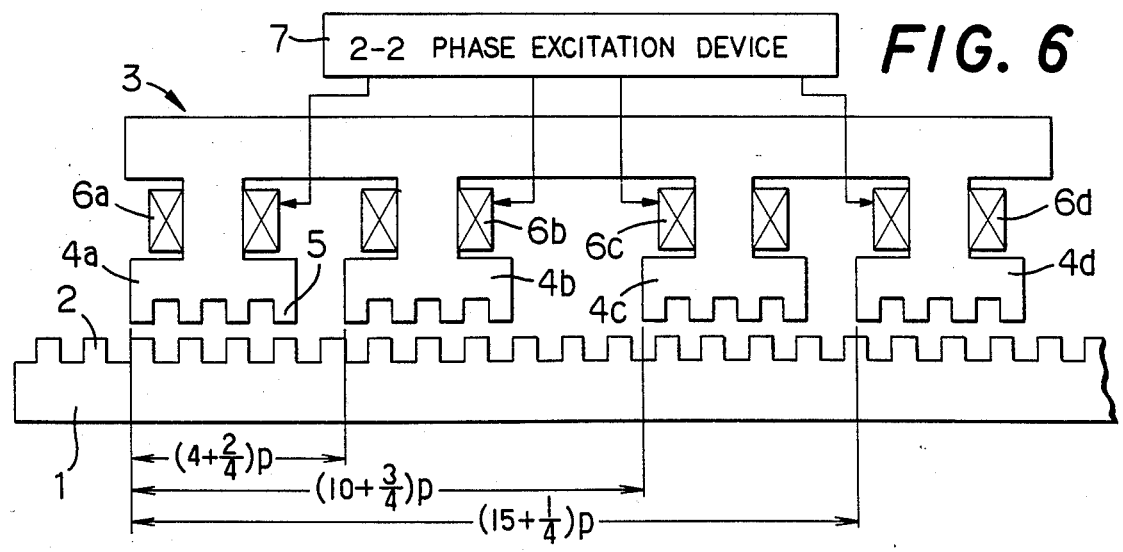
FIG. 6 is a similar view of a fourth embodiment.

A fourth embodiment will be described with reference to FIG. 6. In another type of VR linear stepper motor disclosed herewith, the discrepant amount of the slider teeth 5 on the slider poles 4b, 4c, and 4d is similar to that in the second embodiment, and the interdistance among the slider poles 4a, 4b, 4c, and 4d is, assuming the left extremity of the A pole 4a as a reference line, (4+2/4)p at the left extremity of the B pole 4b, (10+3/4)p at the left extremity of the C pole 4c, and (15+1/4)p at the left extremity of the D pole 4d. The effect in the slider structure is identical to that in the third embodiment. It is a matter of course that the excitation sequence in the fourth embodiment is just like that in the second embodiment.

In reviewing all of the above embodiments the undermentioned will be understood as that (1) the distance among the slider poles of the slider 3 respectively includes a fraction of a pitch, i.e., 1/2 pitch between A pole-B pole, 1/4 pitch between B pole-C pole and 1/2 between C pole-D pole, and that (2) there are only two kinds of arrangement in actuality for satisfying the above-mentioned conditions, one shown in the first and third embodiments, the other shown in the second and fourth embodiments. When, for example, the B pole is displaced relatively to the stator teeth 2 by 1/2 pitch in rightward direction, it means at the same time that the B pole is leftwardly displaced from the stator teeth 2 by 1/2 pitch. So the fractional tooth pitch displacement by 1/2 pitch of the B pole relative to the A pole is always interpreted to mean that the B pole is displaced relative to the A pole by 1/2 pitch. The fractional displacement by 1/4 pitch at the C pole relative can be thought in two ways:

(1) the C pole is relative to the A pole, rightwardly displaced by

1/2 pitch − 1/4 pitch = 1/4 pitch, and (2) the C pole is relative to the A pole, rightwardly displaced by 1/2 pitch + 1/4 pitch = 3/4 pitch In other words, there can be the following two cases:

(1) In relation to the A pole, the B pole is displaced rightwardly by 1/2 pitch and the C pole is displaced rightwardly by 1/4 pitch, and (2) In relation to the A pole, the B pole is displaced rightwardly by 1/2 pitch and the C pole is displaced rightwardly by 3/4 pitch.

Displacement of the D pole relative to the C pole by 1/2 pitch means that: When the C pole is displaced relative to the A pole by 1/4 pitch as indicated above in (1), the D pole is relative to the A pole, displaced rightwardly by:

1/4 pitch − 1/2 pitch = −1/4 pitch (which is virtually equal to 3/4 pitch), and

1/4 pitch + 1/2 pitch = 3/4 pitch.

So it can be always said that the D pole is displaced relative to the A pole by 3/4 pitch, irrespective of the direction in which 1/2 pitch relative to the C pole. When the C pole is displaced relative to the A pole by 3/4 pitch as indicated above in (2), the D pole is, relative to the A pole, displaced rightwardly by:

3/4 pitch − 1/2 pitch = 1/4 pitch, and

3/4 pitch + 1/2 pitch = 5/4 pitch (which is virtually equal to 1/4 pitch)

So the D pole is relative to the A pole displaced by 1/4 pitch, respective of the direction in which the D pole is displaced 1/2 pitch relative to the C pole.

Finally the pole arrangement in which the fractional displacement between the poles relative to the slider teeth thereof are 1/2 between A pole-B poles, 1/4 between B pole-C poles, and 1/2 between C pole-D poles can be obtained in two, different settings of tooth pitch displacements of the B, C and D poles relative to the A pole, i.e., the arrangement shown in the first and third embodiments and that shown in the second and fourth embodiments.

What is claimed is:

1. A linear stepper motor of the variable reluctance type comprising:
    a stator having a plurality of stator teeth formed with an equal pitch p along a longitudinal direction;
    a slider having four slider poles consisting of A pole, B pole, C pole, and D pole arranged in a longitudinal direction in that order, each of said slider poles being provided with a plurality of slider teeth formed oppositely to, and with identical pitch with, said stator teeth;
    distances separating said B pole, C pole and D pole from said A pole being respectively $(L+2/4)p$, $(M+1/4)p$ and $(N+3/4)p$ wherein L, M and N are natural numbers;
    four windings, wound about and cooperating with said four slider poles independently to form A phase, B phase, C phase and D phase, respectively; and
    2-2 phase excitation means for repeatedly exciting two of said four windings in at least one of a first sequence of A phase-C phase, C phase-B phase, B phase-D phase and D phase-A phase, and a second sequence which is a reversal of the former, to move said slider in increments of 1/4 pitch.

2. A linear stepper motor of the variable reluctance type comprising:
    a stator having a plurality of stator teeth formed with an equal pitch p along a longitudinal direction;
    a slider having four slider poles consisting of A pole, B pole, C pole, and D pole arranged in a longitudinal direction in that order, each of said slider poles being provided with a plurality of slider teeth formed oppositely to, and with identical pitch with, said stator teeth;
    distances separating said B pole, C pole and D pole from said A pole beign respectively $(L+2/4)p$, $(M+3/4)p$ and $(N+1/4)p$ wherein L, M and N are natural numbers;
    four windings wound about and cooperating with said four slider poles independently to form A phase, B phase, C phase and D phase, respectively; and
    2-2 phase excitation means for repeatedly exciting two of said four windings in at least one of and first sequence of A phase-D phase, D phase-B phase, B phase-C phase and C phase-A phase, and a second sequence which is a reversal of the former, to move said slider in increments of 1/4 pitch.

3. A linear stepper motor in accordance with claim 1 or 2, wherein said slider poles are arranged such that a distance between said A pole and said B pole and a distance between said C pole and said D pole are smaller than a distance between said B pole and said C pole.

* * * * *